US010902437B2

(12) United States Patent
Bhogal et al.

(10) Patent No.: US 10,902,437 B2
(45) Date of Patent: Jan. 26, 2021

(54) INTERACTIVE PRODUCT EVALUATION AND SERVICE WITHIN A VIRTUAL UNIVERSE

(75) Inventors: Kulvir S. Bhogal, Fort Worth, TX (US); Rick A. Hamilton, II, Charlottesville, VA (US); Jenny S. Li, Danbury, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1428 days.

(21) Appl. No.: 12/139,297

(22) Filed: Jun. 13, 2008

(65) Prior Publication Data
US 2009/0313085 A1   Dec. 17, 2009

(51) Int. Cl.
*G06Q 30/02* (2012.01)
(52) U.S. Cl.
CPC ......... *G06Q 30/02* (2013.01); *G06Q 30/0282* (2013.01)
(58) Field of Classification Search
USPC ...................................................... 705/7.29
See application file for complete search history.

(56) References Cited

U.S. PATENT DOCUMENTS

| | | | |
|---|---|---|---|
| 7,552,068 B1* | 6/2009 | Brinkerhoff | 705/7.32 |
| 2005/0216346 A1* | 9/2005 | Kusumoto et al. | 705/14 |
| 2007/0239552 A1* | 10/2007 | Sundaresan | 705/26 |
| 2007/0294171 A1* | 12/2007 | Sprunk | 705/50 |
| 2008/0162261 A1* | 7/2008 | Velazquez et al. | 705/10 |
| 2008/0163054 A1* | 7/2008 | Pieper et al. | 715/706 |
| 2008/0195507 A1* | 8/2008 | Ratnakar | 705/27 |
| 2008/0215975 A1* | 9/2008 | Harrison et al. | 715/706 |
| 2008/0263458 A1* | 10/2008 | Altberg et al. | 715/757 |
| 2009/0098939 A1* | 4/2009 | Hamilton et al. | 463/42 |
| 2009/0106671 A1* | 4/2009 | Olson et al. | 715/757 |
| 2009/0167766 A1* | 7/2009 | Porter et al. | 345/473 |
| 2009/0177977 A1* | 7/2009 | Jones et al. | 715/753 |
| 2010/0005424 A1* | 1/2010 | Sundaresan et al. | 715/849 |

OTHER PUBLICATIONS

"IMVU Virtual Goods Rating Policy", Sep. 2007, 9 Pages, downloaded from http://www.imvu.com/catalog/modules.php?op=modload &name=phpbb2&file=viewtopic.php&t=155240.*

* cited by examiner

*Primary Examiner* — Lynda Jasmin
*Assistant Examiner* — Ehrin L Pratt
(74) *Attorney, Agent, or Firm* — Brian M. Restauro (57) ABSTRACT

An approach that provides interactive product evaluation and service within a virtual universe is described. In one embodiment, there is an evaluation indicating component that is configured to permit an owner of a virtual universe product to indicate a desire to have at least one avatar in the virtual universe evaluate the virtual universe product. An evaluation generating component is configured to generate an invitation that requests an evaluation of the virtual universe product. An evaluation collecting component is configured to collect the evaluation of the virtual universe product.

19 Claims, 5 Drawing Sheets

INTERACTIVE PRODUCT EVALUATION AND SERVICE WITHIN A VIRTUAL UNIVERSE

FIELD OF THE INVENTION

This invention relates generally to virtual environments and more specifically to facilitating interactive product evaluation and service within a virtual universe.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. These types of virtual universes are now most common in massively multiplayer online games such as Second Life which is a trademark of Linden Research in the United States, other countries or both. Avatars in these types of virtual universes, which can number well over a million, have a wide range of business and social experiences.

Buying and selling virtual products is one type of business and social experience that avatars can have while in a virtual universe. Values of these virtual universe products are typically determined by subjective valuations of owners and users of these products. Currently available virtual universes do not have the facility for an avatar to make an evaluation of their virtual product items. Furthermore, there is no facility for a virtual universe resident (i.e., a user or avatar that uses the virtual universe) to invite other members of the virtual universe to evaluate their virtual product items.

SUMMARY OF THE INVENTION

In one embodiment, there is a method for evaluating a virtual universe product. In this embodiment, the method comprises: providing a medium to an avatar that is on-line in a virtual universe to evaluate the virtual universe product; and receiving an evaluation of the virtual universe product from the avatar.

In a second embodiment, there is a computer system for evaluating a virtual universe product. In this embodiment, the system comprises at least one processing unit and memory operably associated with the at least one processing unit. A virtual universe product evaluation tool is storable in memory and executable by the at least one processing unit. The virtual universe product evaluation tool comprises an evaluation indicating component configured to permit an owner of the virtual universe product to indicate a desire to have at least one avatar in the virtual universe evaluate the virtual universe product. An evaluation generating component is configured to generate an invitation that requests an evaluation of the virtual universe product. An evaluation collecting component is configured to collect the evaluation of the virtual universe product.

In a third embodiment, there is a computer-readable medium storing computer instructions, which when executed, enables a computer system to facilitate evaluation of a virtual universe product. In this embodiment, the computer instructions comprise: permitting an owner of the virtual universe product to indicate a desire to have at least one avatar in the virtual universe evaluate the virtual universe product; generating an invitation that requests an evaluation of the virtual universe product; and collecting the evaluation of the virtual universe product.

In a fourth embodiment, there is a method for deploying a virtual universe product evaluation tool for use in a computer system that facilitates evaluation of a virtual universe product. In this embodiment, a computer infrastructure is provided and is operable to: provide a medium to an avatar that is on-line in a virtual universe to evaluate the virtual universe product; and receive an evaluation of the virtual universe product from the avatar.

DETAILED DESCRIPTION OF THE INVENTION

Embodiments of this invention are directed to a technique for facilitating the evaluation of virtual universe products or items by residents (e.g., the avatars) of the universe. In particular embodiments, residents can evaluate items in their own or others' inventories, and such evaluations may optionally be routed to third party providers (e.g., sellers, distributors and manufacturers) in the virtual universe, another virtual universe, or the real world for performance of one of a number of acts related to the virtual universe product (e.g., market analysis, product analysis, customer support, etc.). In another embodiment, these evaluations may also be made available to the public (i.e., the residents), to other special parties in the virtual universe or in the real world by means of a display.

Figure 1:
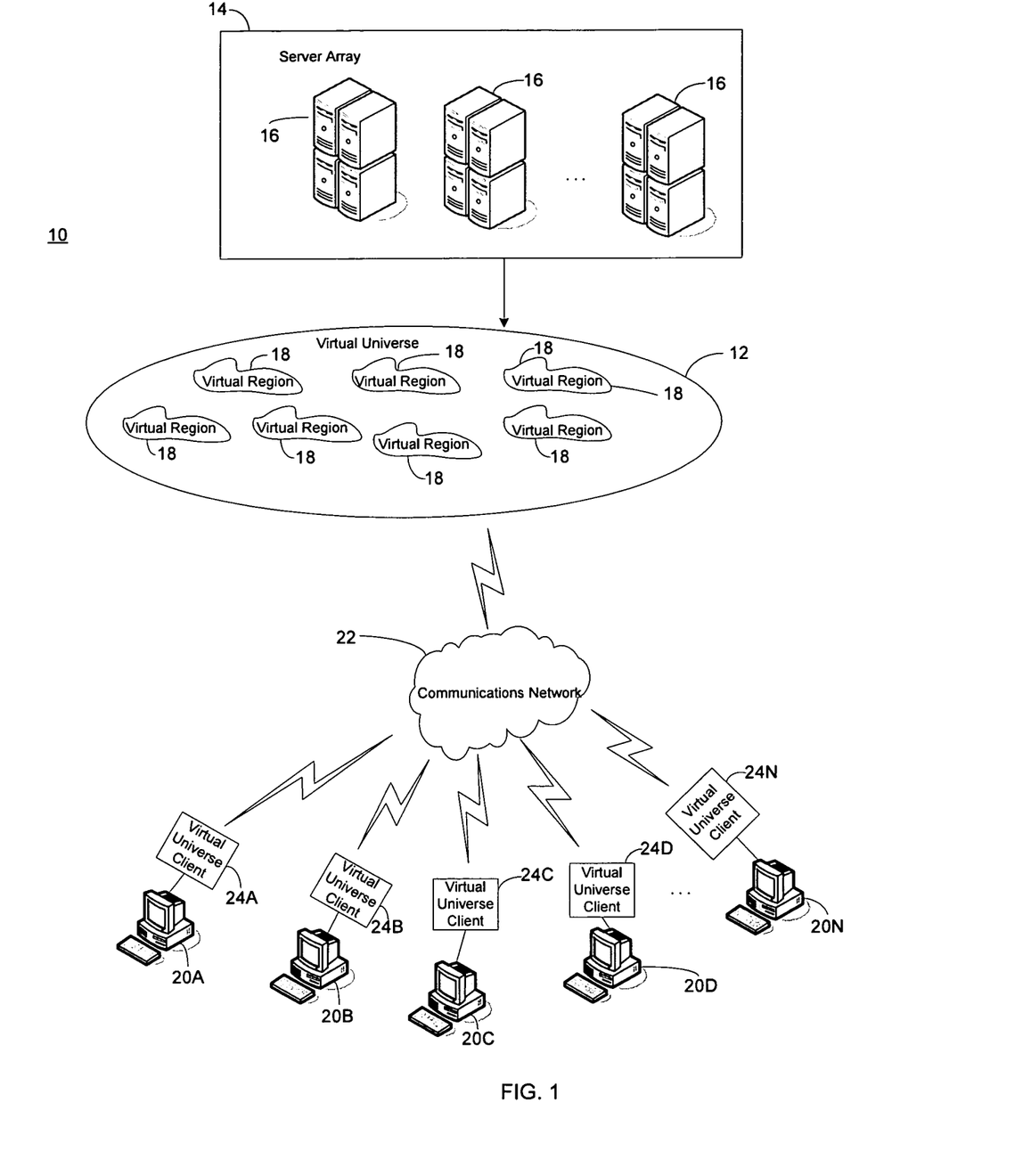
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a virtual universe product evaluation tool can be utilized. As shown in FIG. 1, the networking environment 10 comprises a server array or grid 14 comprising a plurality of servers 16 each responsible for managing a sliver of virtual real estate within the virtual universe 12. A virtual universe provided by a typical massively multiplayer online game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20N (hereinafter referred generally as 20) interact with the virtual universe 12 through a communication network 22 via virtual universe clients 24A-24N (hereinafter referred generally as 24) that resides in the computers, respectively. Below are further details of the virtual universe 12, server array 14, and virtual universe client 24.

Figure 2:
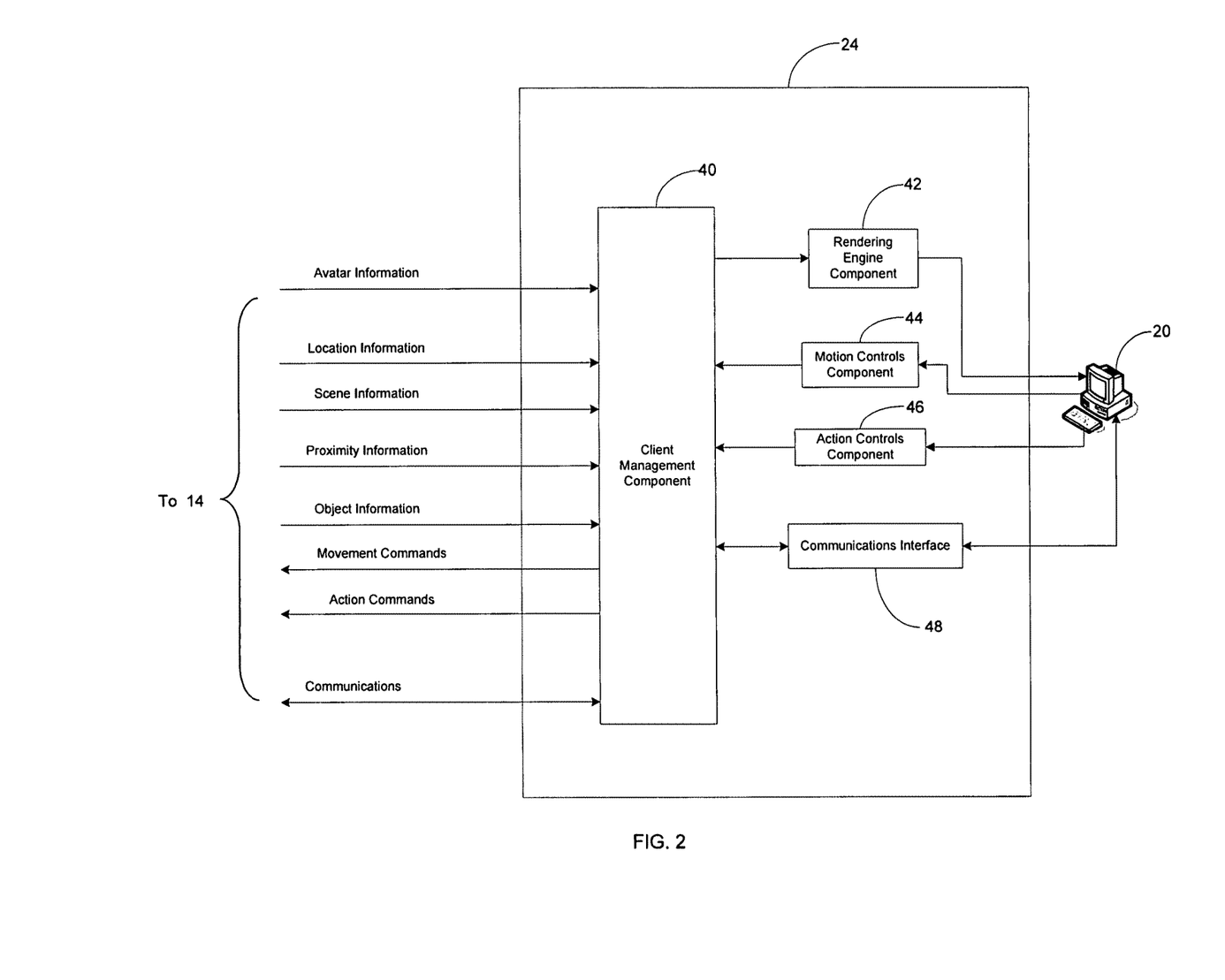
FIG. 2 shows a more detailed view of the virtual universe client shown in FIG. 1.

FIG. 2 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and electronic mail (e-mail).

FIG. 2 shows the various types of information received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or land he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., invoking, pushing, picking up, etc.). FIG. 2 also shows the movement commands and action commands that are generated by the user are sent to the server array via the client management component 40, as well as the communications that can be sent to the users of other avatars within the virtual universe.

Figure 3:
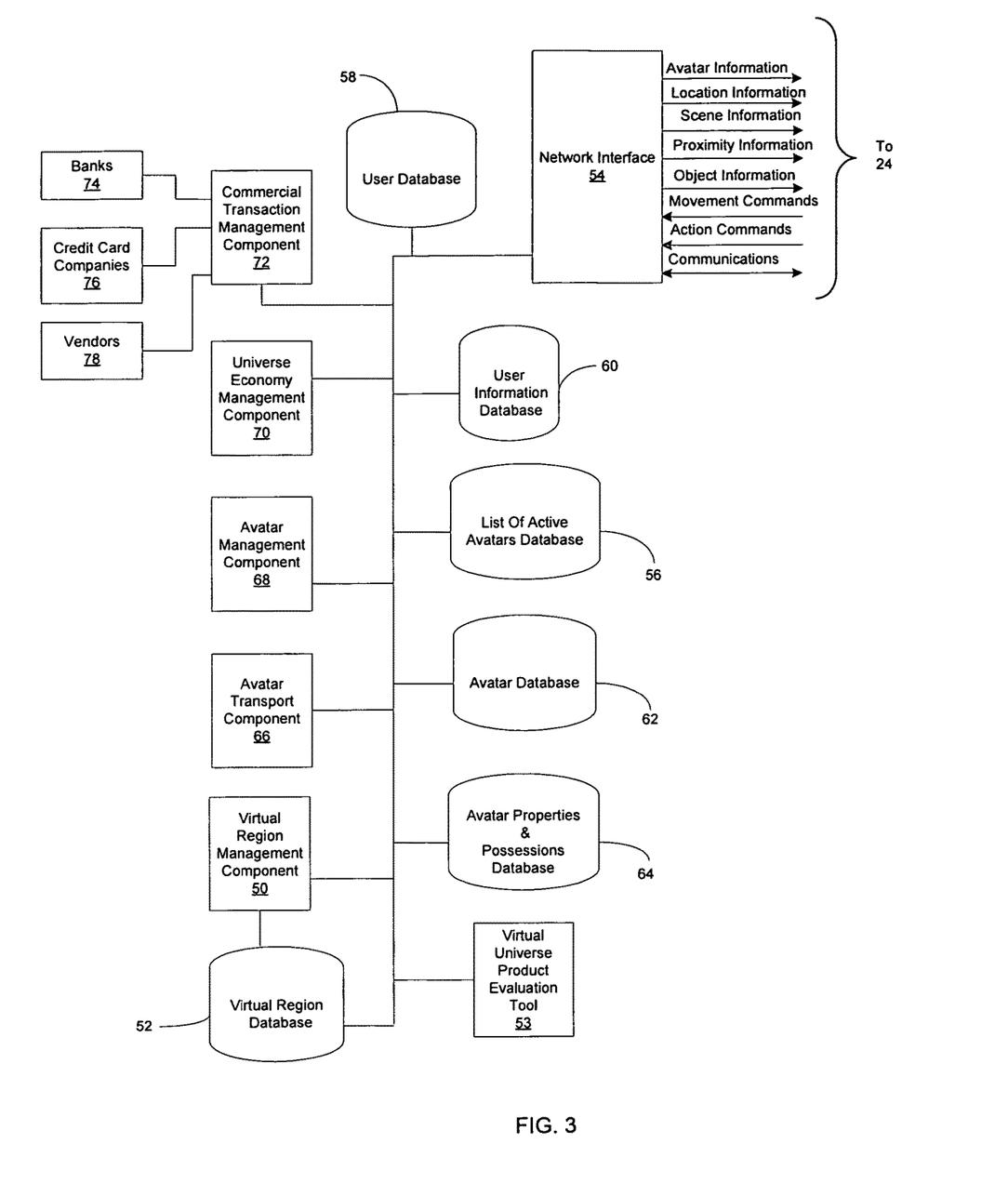
FIG. 3 shows a more detailed view of some of the functionalities provided by the server array shown in FIG. 1.

FIG. 3 shows a more detailed view of some of the functionalities provided by the server array 14 shown in FIG. 1. In particular, FIG. 3 shows a virtual region management component 50 that manages a virtual region within the virtual universe. In particular, the virtual region management component 50 manages what happens in a particular region such as the type of landscape in that region, the number of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatars can ascertain if there will be a potential effect on their use of specific inventory items within that region. Those skilled in the art will recognize that the virtual region management component 50 can manage many other facets within the virtual region.

A virtual region database 52 stores information on all of the specifics in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular land within the virtual region 18.

A virtual universe product evaluation tool 53 facilitates the evaluation of virtual universe products or items by avatars that reside in the virtual universe. In particular, the virtual universe product evaluation tool 53 is configured to enable avatars to evaluate items in their own or others' inventories. These evaluations may optionally be routed to third party providers (e.g., sellers, distributors and manufacturers) in the virtual universe, another virtual universe, or the real world where a number of functions can be performed that relate to the virtual universe product. In addition, these evaluations may also be made publicly available to all avatars in the virtual universe or a restricted number of avatars. Below is a more detailed discussion of the virtual universe product evaluation tool 53 and how it performs the above-mentioned functions.

FIG. 3 shows a network interface 54 that enables the server array 14 to interact with the virtual universe client 24 residing on computer 20. In particular, the network interface 54 communicates avatar, location, scene, proximity and object information to the user through the virtual universe client 24 and receives movement and action commands as well as communications from the user via the universe client.

As shown in FIG. 3, there are several different databases for storing information. In particular, database 56 contains a list of all the avatars that are online in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions.

Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features) while database 64 contains an inventory of items that they own, and these inventory items may be bought, sold, traded, etc., during operation of the virtual universe. Items in a typical inventory may include clothing, virtual pets, vehicles, electronic media (e.g., music files), or other possessions. Those skilled in the art will recognize that this listing of inventory items is illustrative of possible items and is not exhaustive. For example, other inventory items may include graphics files, sound files, animations, electronic documents, video files, avatar accessories, avatar body parts, avatar tools or other objects, avatar gestures, automated avatars, calling cards, landmarks (such as bookmarked locations) or other geographical information, items in a lost and found folder, note cards, photos and photo albums, scripts (e.g. macros to perform actions), textures, deleted items, or any other type of item.

Each inventory item may represent a piece of executable code or other data which may be rendered in some fashion to the user during a session in the virtual universe. Clothing inventory, for example, may be rendered as clothing for the user's avatar while a virtual dog, in another example, may render as an automated avatar that follows the user's avatar within the virtual universe. In other embodiments, inventory items may be represented as non-executable data that may be used by the virtual universe to render the inventory item for the user when needed. The contents of a user's inventory are typically displayed in a hierarchical manner similar to an operating system's display of folders, subfolders, and files within a files system.

As virtual universes become more mainstream within a business setting, it is conceivable that users will want to have public and private inventories for their avatar in order to protect unwanted invasion of confidential and proprietary information. Therefore, in one embodiment, the database 62 may contain public and private inventories in order to account for various business and social encounters that need to be shielded from unauthorized parties.

Those skilled in the art will recognize that databases 58-64 may contain additional information if desired. Although the above information is shown in FIG. 3 as being stored in databases, those skilled in the art will recognize that other means of storing information can be utilized.

An avatar transport component 66 enables users to transport, which as mentioned above, allows avatars to transport through space from one point to another point, instantaneously. As a result, an avatar could for example travel from a business region to an entertainment region to hear a concert. Moving from one point or virtual region to another point could ultimately affect the inventory items that an avatar could use in a particular location. For example, if the avatar was leaving work from the business district with some proprietary information then the transformation tool of this invention could transform the proprietary information to a newspaper. In this example, well-known encryption/decryption techniques can be used in the transformation of documentation.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. For example, an avatar might want to pay for a service that provides this automatic inventory item transformation. In this case, the avatar would make the purchase of this service using the virtual universe currency. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78.

Figure 4:
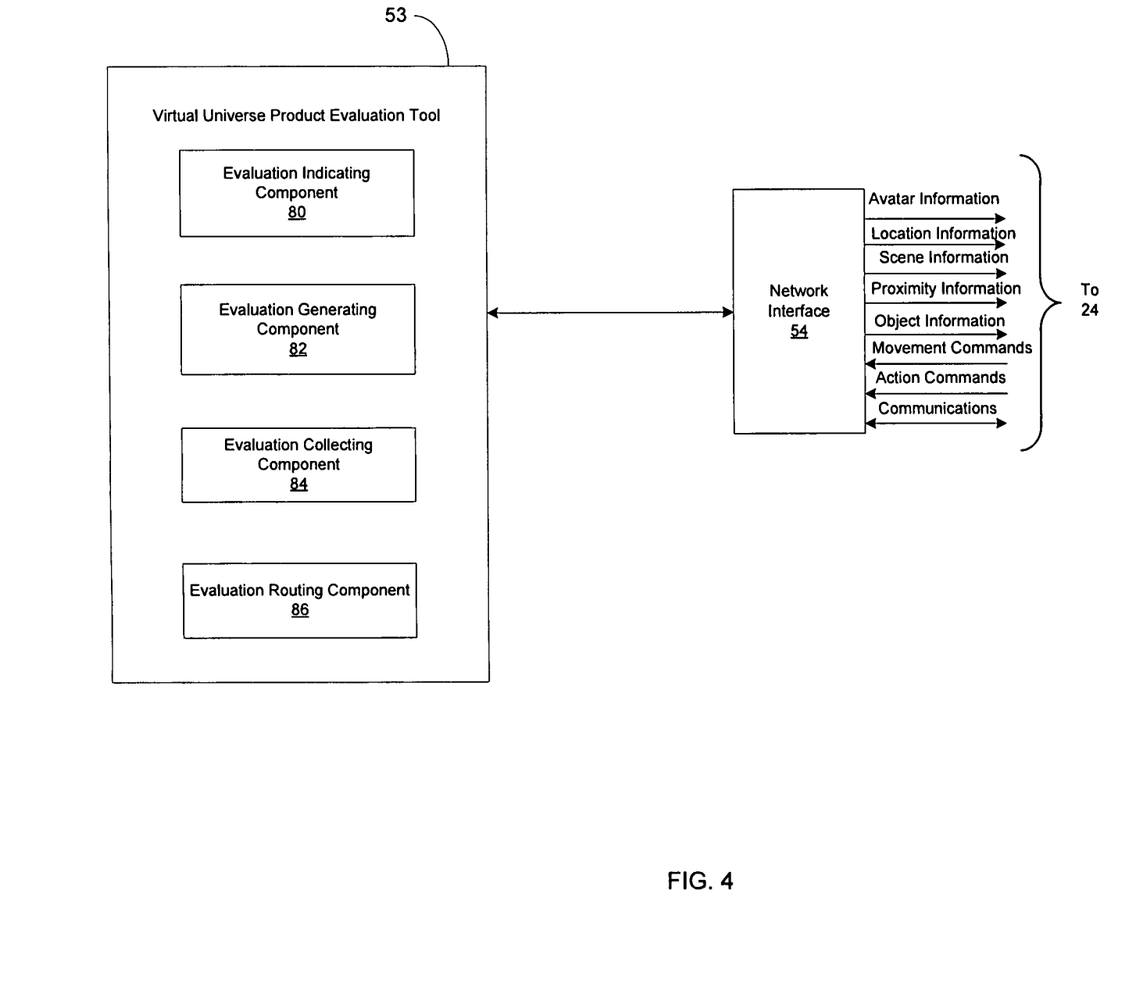
FIG. 4 shows a virtual universe product evaluation tool according to one embodiment of this invention that operates in the environment shown in FIG. 1.

FIG. 4 shows a more detailed view of the virtual universe product evaluation tool 53. As mentioned above, the virtual universe product evaluation tool facilitates the evaluation of virtual universe products or items by avatars that reside in the virtual universe. These evaluations may optionally be routed to third party providers (e.g., sellers, distributors and manufacturers) in the virtual universe, another virtual universe, or the real world where a number of functions can be performed that relate to the virtual universe product. In addition, these evaluations may also be made publicly available to all avatars in the virtual universe or a restricted number of avatars.

In FIG. 4, the virtual universe product evaluation tool resides on the same computer system as the server 14 and communicates directly to the virtual universe and its residents via the virtual universe client 24. In other embodiments, the virtual universe product evaluation tool 53 might reside on the same computers as the virtual universe client 24, or reside on separate computers in direct communication with the virtual universe servers 16 and virtual universe clients 24.

FIG. 4 shows that the virtual universe product evaluation tool 53 comprises an evaluation indicating component 80 configured to permit an owner of a virtual universe product to indicate a desire to have at least one avatar in the virtual universe 12 evaluate the virtual universe product. As used herein an owner is a party that has authority to dispose (i.e., sell, trade, lease, barter, manufacture, market) of the virtual universe product. As used herein the virtual universe product is any virtual universe item that can be disposed of by the avatars that reside in the virtual universe 12. A non-exhaustive listing of virtual universe products that can be disposed of in the virtual universe include clothes, hair pieces, decorative features, gestures, architectural objects and functional code (e.g., avatar-carried software, video viewers and document encrypters/decrypters).

There are a number of indications that the evaluation indicating component 80 can be used to generate. For example, in one embodiment, the evaluation indicating component 80 can be used by an avatar to generate an indication that expresses the desire to have an evaluation that is open to all avatars or to a restricted number of avatars (e.g., a subset of virtual universe residents that are pre-approved). In the case where the evaluation of the virtual universe product is open for public evaluation, the owner can associate an indicator to the item. For example, one could activate a glowing light around the item that needs to be evaluated, or have a "click me to earn monetary award" sign on top of his or her head, or on the product itself etc. This will attract others who are within a close proximity with the product owner to give their evaluation. In the case where the evaluation is restricted to a limited number or invited-only avatars, the owner can right-click on the item in his or her inventory which he or she would like others to comment on and select an "invite comments" feature. This feature will generate a form which the owner can fill in the group of people he or she would like to invite and the end of the comment period.

In addition to indicating who can evaluate a certain virtual universe product, the evaluation indicating component 80 can be used to indicate that a certain reward will be provided to avatars that take the time to evaluate the product. Some examples of possible rewards include a cash/credit reward (e.g., crediting an evaluator's account with an amount of virtual universe currency), coupons or give-away products (e.g. each evaluator will get a free soda that will be added to the evaluator's inventory) and store discounts.

Referring back to FIG. 4, the virtual universe product evaluation tool 53 further comprises an evaluation generating component 82 configured to generate an invitation that requests an evaluation of the virtual universe product. One function that generating an invitation encompasses is generating an evaluation form that avatars can use to enter evaluation data that pertains to the evaluation of the virtual universe product. The evaluation generating component 82 can generate an evaluation form that can take on a variety of forms. Below is one example of an evaluation form. Those skilled in the art will recognize that this form is illustrative of one type of form that can be generated and that other types are certainly possible.

Owner name: Susan Fungirl

Product: Green Sneakers

Serial number: SN123456789

Evaluator Avatar IDs: Mars Man, Batman Robin, XMen Willy

Evaluation period end date: June 2008

Comments: Let me know if you like these sneakers or not? I'm thinking about buying them for my best friend as her birthday present. Thanks.

Rewards: $10 virtual universe currency

In this example, the form includes the owner name (i.e., Susan Fungirl) and product (i.e., Green Sneakers) and its respective identification (i.e., serial number 123456789) that the avatar would like to have evaluated. In this example, only a specified number of avatars (i.e., Mars Man, Batman Robin, XMen Willy) are invited to evaluate the product and the period to respond terminates June 2008. This also includes general comments about the evaluation and in this example a reward (i.e., $10 virtual universe currency) is provided for submitting an evaluation.

Another function that the evaluation generating component 82 can perform includes selecting a mode of transmitting the evaluation request to the avatars. In one embodiment, the evaluation generating component 82 can send out requests to evaluate, which includes the form, by various modes of communication methods. For example, the evaluation generating component 82 can notify potential evaluator avatars by dispatching an email, text messaging, chatting, blogging, and other well-known communication mechanisms. Other mechanisms specific to virtual universes may include teleporting.

There are a number of possibilities of evaluating a virtual universe product once the invitation has been received. For example, in the case where the virtual universe product of Green Sneakers is open for public evaluation, evaluating avatars can leave a comment right away by right-clicking on the owner's sneakers and select the "evaluate product" feature, or record the owner's name and send a message to him or her with their comments. Then the evaluation form will be displayed with pre-filled fields. In this case, the evaluator only needs to fill in the Rating and Comments fields, and the optional Evaluator Avatar ID. Below is an example of a pre-filled evaluation form.

Owner name: Susie Fungirl

Product: Green sneakers

Rating (1-5 stars): 2

Comments: The green looks terrible on you. You should try something orange

Evaluator Avatar ID (optional): (blank=anonymous)

Rewards: $10 virtual universe currency

In this example, the pre-filled fields of the form include the owner name, product, and rewards, whereas the fields that require input are the rating, comments and the evaluator identification.

In the case where the evaluation of the virtual universe product of Green Sneakers is restricted, the owner can send a message to the invited parties to tell them that he or she is requesting them to evaluate his or her products. For example, the owner can associate an image or video of him or her with the products with the message to the invited parties. The invited parties who are interested in evaluating the product can perform one of a number of actions. For example, if the evaluation invitation does not include an image or video of the owner, then the evaluator would need to track down the owner. The evaluator would search for the owner avatar, and invite him or her to teleport to the evaluator's location. Then the evaluator would give the owner avatar the evaluation right away. If the evaluation invitation contains an image or video of the owner, then the evaluator could simply fill in the evaluation form and return it back to the owner. Of course, in some instances an evaluator may not have to see an avatar wear/use a virtual item. In such cases, the evaluator can provide feedback without the need for teleportation.

Those skilled in the art will recognize that the example of "green sneakers," is only for illustration purposes and that such evaluations facilitated by the virtual universe product evaluation tool 53 can likewise be applied to other decorative code, such as structures, virtual conference rooms, etc., as well as functional software such as document encrypters/decrypters, etc. In addition, those skilled in the art will recognize that the unique combination of physical proximity and three-dimensional environments along with perfect "location based services" allows such feedback in virtual environments that can only be approximated in "real world" situations.

FIG. 4 shows that the virtual universe product evaluation tool 53 further includes an evaluation collecting component 84 that is configured to collect the evaluation of the virtual universe product after it has been completed and submitted. The evaluation collecting component 84 can use a number of well-known data acquisition techniques to retrieve the evaluations and store them in a data repository such as a database.

Generally, the virtual universe products are stored in a database such as an avatar's inventory (i.e., the avatar properties and possession database 64). In embodiments of this invention, the inventory can house evaluation information about virtual products or items. Each virtual product is granted a unique identification that can be thought of as a virtual bar code. In one embodiment, the inventory database includes three tables or other such state representations. One table is a family table that states what family the virtual product belongs to. All products of a family are considered the same. The family simply aggregates all copies of the virtual product. The family identification can be used for analysis of "like items". A second table is a serial number table that stores the unique serial number associated with the product. The third table is an evaluation table, wherein each row includes one (and only one) family identification and one (and only one) serial number. Additional columns in the evaluation table can include: a) Evaluator Avatar ID that designates who is performing the evaluation; b) Evaluating Rating that indicates the value which can be either a string (e.g., "This shirt is great") or a more definitive value such as a rating from 1-5. Those skilled in the art will recognize that the tables in the inventory can be configured to contain other items as well. In addition, other tables can be used if desired.

The evaluations can be stored in the inventory database (i.e., the avatar properties and possession database 64) and used in a variety of ways. For example, the evaluations can be made publicly available and put on display for other avatars to review. Alternatively, if desired, the evaluation can be kept confidential.

As shown in FIG. 4, the virtual universe product evaluation tool 53 includes an evaluation routing component 86 that enables the evaluations to be routed to a third party provider such as a marketing firm, distributor, manufacturer, etc., for subsequent use and review. In this embodiment, the third party provider can perform a number of different functions. In one embodiment, the third party provider can use this evaluation as a "kick-back" system that can offer incentives to purchasers of the evaluated virtual universe product, simply because an evaluation has been performed. One function that can be performed includes initiating an analysis (e.g., a market analysis) of the virtual universe product. A second function that can be performed includes initiating a support session for the virtual universe product. For example, creation of feedback may open a communication channel with a seller's customer service representative or a "third party" customer service representative. Such communication channels may be text-based or voice-based within the virtual universe 12, or they may use legacy communication methods such as email, external to the virtual universe. In addition, creation of feedback may post questions to a user-based questions board, where a distributed user base can provide answers or assistance to the owner or licensee of the virtual universe product. This type of communication channel may be text-based or voice-based within the virtual universe 12, or they may use legacy communication methods such as email, external to the virtual universe.

Those skilled in the art will recognize that the evaluation routing component 86 may route the evaluation directly to the third party provider and/or the inventory database. A number of implementations are possible. For example, if the product owner is interested in keeping the evaluations, then the evaluations can be collected and stored in his or her inventory. Once he or she has accumulated a certain predefined number of evaluations, these evaluations can be optionally sent to the sellers, distributors or other interested entities in batch mode either manually initiated by the owner or by the evaluation routing component 86 in response to being automatically triggered by reaching a certain threshold of evaluations collected. If the product owner is collecting the evaluation on behalf of the seller or other interested entities, then the product owner may not wish to store the evaluations in his or her inventory database. Then the evaluations can be set to route to the sellers or other interested entities directly upon the submission of the evaluation. Another option can be the case where the product owner desires to temporarily keep the evaluation in his or her inventory. In this example, a trans-vendor service agency can request the product owner to send the evaluations to the agency, or the product owner can authorize the agency to extract the evaluations from his or her inventory. Then the trans-vendor service agency may display or disseminate (e.g., by e-mail or through written reports) the results of product evaluations by displaying data housed in the resident inventory database.

Note that evaluations may be conducted at different times and are not limited to any set specific time frame. For example, the evaluation can be conducted at a point of sale, at the time a resident places the item in the resident's inventory, at any time subsequent to the time the resident places the item in the inventory, when an resident is shopping for a virtual item, etc. In addition, the evaluation may also be conducted at the point of use of the item, or when the item is discarded.

In another embodiment of this invention, the virtual universe product evaluation tool is used as a service to charge fees for facilitating virtual universe product evaluation. In this embodiment, the provider of the virtual universe or a third party service provider could offer this product evaluation as a service by performing the functionalities described herein on a subscription and/or fee basis. In this case, the provider of the virtual universe or the third party service provider can create, deploy, maintain, support, etc., the virtual universe product evaluation tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to facilitate product evaluation. In this case, the virtual universe product evaluation tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
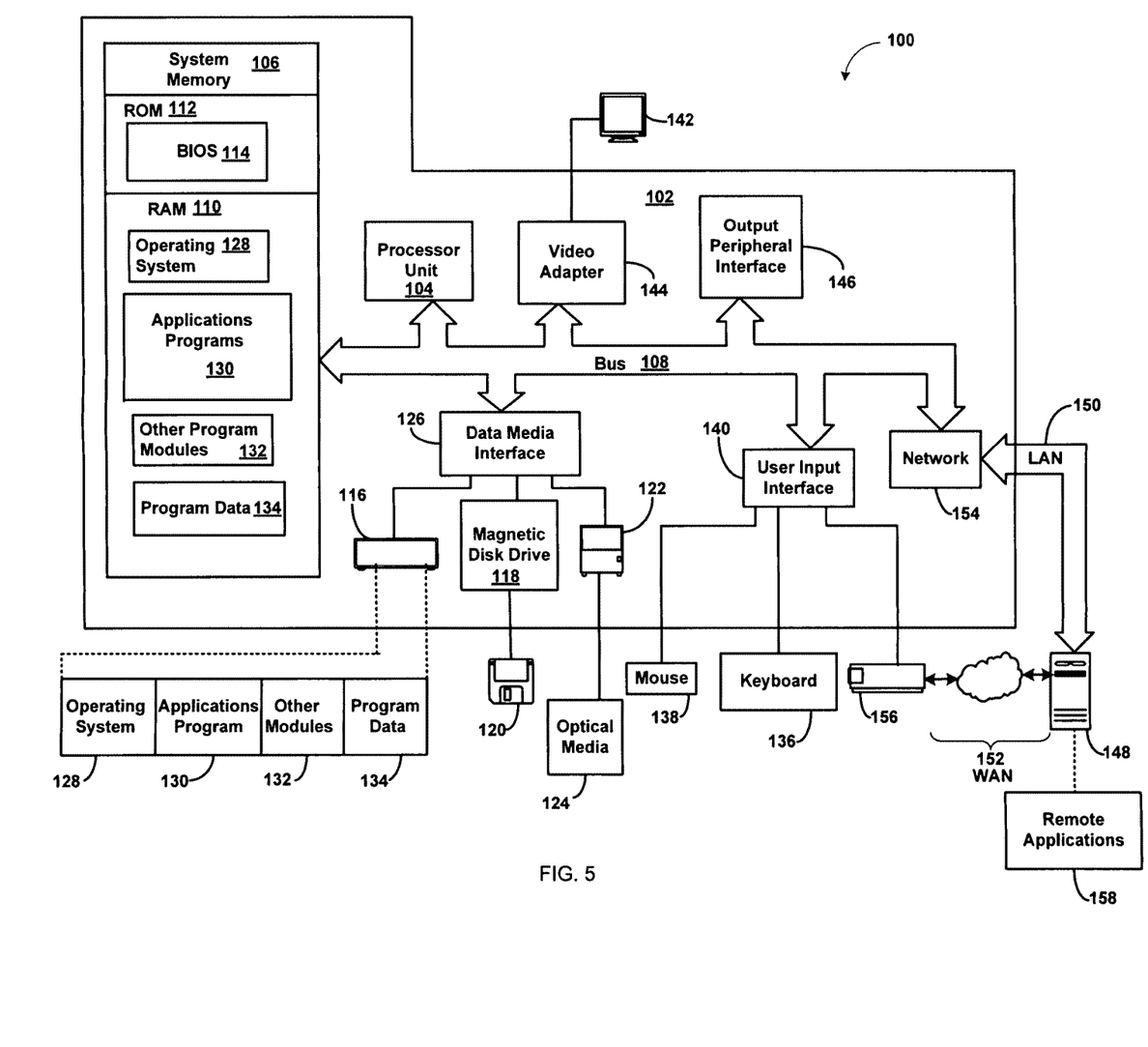
FIG. 5 shows a schematic of an exemplary computing environment in which elements of the networking environment shown in FIG. 1 may operate.

FIG. 5 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 5.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including the server array 14, the virtual universe client 24 and the virtual universe product evaluation tool 53. In one embodiment, the one or more application programs 130 include components of the virtual universe product evaluation tool 53 such as the evaluation indicating component 80, evaluation generating component 82, evaluation collecting component 84, and evaluation routing component 86.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing interactive product evaluation and service within a virtual universe is described. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, comprising:
providing a virtual universe for residents thereof to inhabit and interact via avatars that are representations of the residents, wherein the inhabiting of the avatars in the virtual universe gives an appearance and sensation to the residents of being present in a place in the virtual universe that is different than their true location, and the interacting of the avatars while inhabiting in the virtual universe takes place over a plurality of sensory channels each providing feedback of sensory data to the residents that is experienced by their avatar, the sensory data including sight, sound, touch, taste, and smell, wherein movements and position of the avatar in the virtual universe provide a perspective on reality in the virtual universe and determine what sensory feedback is given;
creating a virtual universe medium on a server array to facilitate evaluations of a virtual universe product created for use in the virtual universe, wherein the virtual universe product to be evaluated resides in an inventory of the avatar or in an inventory of another resident of the virtual universe, each inventory containing a listing of properties and possessions belonging to a resident of the virtual universe that are for use in the virtual universe, wherein each inventory belonging to a resident in the virtual universe is separate and distinct from each other, the virtual universe product in the inventory having an evaluation indicator, generated by an evaluation indicating component embodied in hardware, associated therewith that indicates that an evaluation is desired for the virtual universe product, the evaluation indicator further providing an indication whether the evaluation of the virtual universe product is made publicly available to all residents of the virtual universe or to a restricted set of residents of the virtual universe that have been preapproved by an owner of the virtual universe product, wherein the evaluation indicator is a visual indicator in the virtual universe;
generating an invitation to the avatar that requests that the avatar evaluate the virtual universe product, wherein the invitation comprises an invitation to teleport to a specified region within the virtual universe to evaluate the virtual product, the specified region having a location that is different from a location in which the avatar receives the invitation to teleport;
teleporting the avatar to the specified region within the virtual universe in response to the avatar accepting the invitation to teleport included in the generated invitation;
receiving an evaluation of the virtual universe product from the avatar; and
transmitting the evaluation to a third party provider associated with the virtual universe product; and
initiating a support session with the avatar by the third party provider, in response to the transmitting of the evaluation, for the virtual universe product that is based on the evaluation, wherein the initiating of the support session includes opening a communication channel with a customer service representative that is associated with the third party provider to obtain answers and assistance with regard to the virtual universe product, wherein the assistance is based on a particular feedback of the evaluation,
wherein a user of the avatar generates the received evaluation of the virtual universe product using at least one input device, the at least one input device configured to:
allow the user to control the avatar within the virtual universe, and
input information into the evaluation of the virtual universe product.

2. The method according to claim 1, further comprising receiving an indication that an owner of the virtual universe product desires to have at least one avatar in the virtual universe evaluate the virtual universe product.

3. The method according to claim 2, wherein the indication expresses that the owner is receptive to a public evaluation of the virtual universe product by residents of the virtual universe.

4. The method according to claim 2, wherein the indication expresses that the owner is receptive to a limited evaluation of the virtual universe product by specified residents of the virtual universe.

5. The method according to claim 1, wherein the providing of the medium comprises generating an evaluation form that the avatar can enter with evaluation data.

6. The method according to claim 1, further comprising enabling the third party to offer an incentive to a purchaser of the virtual universe product.

7. The method according to claim 1, further comprising offering an incentive to the avatar for submitting the evaluation.

8. The method according to claim 1, further comprising initiating an analysis of the virtual universe product that is based on the evaluation.

9. The method according to claim 1, further comprising displaying the evaluation for public review thereof.

10. The method according to claim 1, further comprising storing the evaluation in a database.

11. The method according to claim 1, further comprising storing the evaluation in an inventory associated with an owner of the virtual universe product.

12. A computer system, comprising:
at least one processing unit;
memory operably associated with the at least one processing unit;
a virtual universe storable in memory and executable by the at least one processing unit, that renders a virtual universe for residents to inhabit and interact via avatars that are representations of the residents, wherein the inhabiting of the avatars in the virtual universe gives an appearance and sensation to the residents of being present in a place in the virtual universe that is different than their true location, and the interacting of the avatars while inhabiting in the virtual universe takes place over a plurality of sensory channels each providing feedback of sensory data to the residents that is experienced by their avatar, the sensory data including sight, sound, touch, taste, and smell, wherein movements and position of the avatar in the virtual universe provide a perspective on reality in the virtual universe and determine what sensory feedback is given; and
a virtual universe product evaluation tool storable in memory and executable by the at least one processing unit, the tool comprising:
an evaluation indicating component, embodied in hardware, configured to generate an evaluation indicator, for an owner of a virtual universe product created for use in the virtual universe, to indicate a desire to have at least one avatar in the virtual universe evaluate the virtual universe product, wherein the virtual universe product to be evaluated resides in an inventory of the at least one avatar or in an inventory of another resident of the virtual universe, each inventory containing a listing of properties and possessions belonging to a resident of the virtual universe that are for use in the virtual universe, wherein each inventory belonging to a resident in the virtual universe is separate and distinct from each other, the virtual universe product in the inventory having the evaluation indicator associated therewith that indicates that an evaluation is desired for the virtual universe product, the evaluation indicator further providing an indication whether the evaluation of the virtual universe product is made publicly available to all residents of the virtual universe or to a restricted set of residents of the virtual universe that have been preapproved by an owner of the virtual universe product, wherein the evaluation indicator is a visual indicator in the virtual universe;
an evaluation generating component configured to generate an invitation that requests an evaluation of the virtual universe product, wherein the invitation comprises an invitation to teleport to a specified region within the virtual universe to evaluate the virtual product, the specified region having a location that is different from a location in which the avatar receives the invitation to teleport;
a teleporting component configured to teleport the avatar to the specified region within the virtual universe in response to the avatar accepting the invitation to teleport included in the generated invitation;
an evaluation collecting component configured to collect the evaluation of the virtual universe product; and
an evaluation routing component configured to transmit the evaluation to a third party provider associated with the virtual universe product to initiate a support session with the avatar by the third party provider, in response to the transmitting of the evaluation, for the virtual universe product that is based on the evaluation, wherein initiating the support session includes opening a communication channel with a customer service representative that is associated with the third party provider to obtain answers and assistance with regard to the virtual universe product, wherein the assistance is based on a particular feedback of the evaluation; and
at least one input device in communication with the at least one processing unit, the at least one input device configured to:
allow the user to control the avatar in the virtual universe, and
input information into the evaluation of the virtual universe product wherein a user of the avatar generates the evaluation of the virtual universe product using the at least one input device.

13. The system according to claim 12, wherein the evaluation generating component is configured to generate an evaluation form that the avatar can enter with evaluation data.

14. The system according to claim 12, wherein the evaluation routing component is configured to store the evaluation in one of a database or an inventory associated with an owner of the virtual universe product.

15. A non-transitory computer-readable medium storing computer instructions, which when executed, enables a computer system to facilitate evaluation of a virtual universe product, the computer instructions comprising:
providing a virtual universe for residents thereof to inhabit and interact via avatars that are representations of the residents, wherein the inhabiting of the avatars in the virtual universe gives an appearance and sensation to the residents of being present in a place in the virtual universe that is different than their true location, and the interacting of the avatars while inhabiting in the virtual universe takes place over a plurality of sensory channels each providing feedback of sensory data to the residents that is experienced by their avatar, the sensory data including sight, sound, touch, taste, and smell, wherein movements and position of the avatar in the virtual universe provide a perspective on reality in the virtual universe and determine what sensory feedback is given;
creating a virtual universe medium on a server array to facilitate evaluations of a virtual universe product created for use in the virtual universe by providing an environment for an owner of the virtual universe product to indicate a desire to have at least one avatar in the virtual universe evaluate the virtual universe product, wherein the virtual universe product to be evaluated resides in an inventory of the at least one avatar or in an inventory of another resident of the virtual universe, each inventory containing a listing of properties and possessions belonging to a resident of the virtual universe that are for use in the virtual universe, wherein each inventory belonging to a resident in the virtual universe is separate and distinct from each other, the virtual universe product in the inventory having an evaluation indicator, generated by an evaluation indicating component embodied in hardware, associated therewith that indicates that an evaluation is desired for the virtual universe product, the evaluation indicator further providing an indication whether the evaluation of the virtual universe product is made publicly available to all residents of the virtual universe or to a restricted set of residents of the virtual universe that have been preapproved by an owner of the virtual universe product, wherein the evaluation indicator is a visual indicator in the virtual universe;

generating an invitation that requests an evaluation of the virtual universe product, wherein the invitation comprises an invitation to teleport to a specified region within the virtual universe to evaluate the virtual product;

teleporting the avatar to the specified region within the virtual universe in response to the avatar accepting the invitation to teleport included in the generated invitation;

collecting the evaluation of the virtual universe product; and transmitting the evaluation to a third party provider of the virtual universe product; and initiating a support session with the avatar by the third party provider, in response to the transmitting of the evaluation, for the virtual universe product that is based on the evaluation, wherein the initiating of the support session includes opening a communication channel with a customer service representative that is associated with the third party provider to obtain answers and assistance with regard to the virtual universe product, wherein the assistance is based on a particular feedback of the evaluation, wherein a user of the avatar generates the collected evaluation of the virtual universe product using at least one input device of the computing system, the at least one input device configured to:

allow the user to control the avatar within the virtual universe, and input information into the evaluation of the virtual universe product.

16. The non-transitory computer-readable medium according to claim 15, further comprising instructions for charging an evaluation fee to one of: the owner of the virtual universe product or a provider of the virtual universe.

17. A method for deploying a virtual universe product evaluation tool for use in a computer system that facilitates evaluation of a virtual universe product, comprising:

providing a computer infrastructure operable to:

provide a virtual universe for residents thereof to inhabit and interact via avatars that are representations of the residents, wherein the inhabiting of the avatars in the virtual universe gives an appearance and sensation to the residents of being present in a place in the virtual universe that is different than their true location, and the interacting of the avatars while inhabiting in the virtual universe takes place over a plurality of sensory channels each providing feedback of sensory data to the residents that is experienced by their avatar, the sensory data including sight, sound, touch, taste, and smell, wherein movements and position of the avatar in the virtual universe provide a perspective on reality in the virtual universe and determine what sensory feedback is given;

provide a medium to an avatar that is on-line in the virtual universe to evaluate the virtual universe product, wherein the virtual universe product to be evaluated resides in an inventory of the avatar or in an inventory of another resident of the virtual universe, each inventory containing a listing of properties and possessions belonging to a resident of the virtual universe that are for use in the virtual universe, wherein each inventory belonging to a resident in the virtual universe is separate and distinct from each other, the virtual universe product in the inventory having an evaluation indicator, generated by an evaluation indicating component embodied in hardware, associated therewith that indicates that an evaluation is desired for the virtual universe product, the evaluation indicator further providing an indication whether the evaluation of the virtual universe product is made publicly available to all residents of the virtual universe or to a restricted set of residents of the virtual universe that have been preapproved by an owner of the virtual universe product, wherein the evaluation indicator is a visual indicator in the virtual universe;

generate an invitation to the avatar that requests that the avatar evaluate the virtual universe product, wherein the invitation comprises an invitation to teleport to a specified region within the virtual universe to evaluate the virtual product, the specified region having a location that is different from a location in which the avatar receives the invitation to teleport;

teleport the avatar to the specified region within the virtual universe in response to the avatar accepting the invitation to teleport included in the generated invitation;

receive an evaluation of the virtual universe product from the avatar; and transmit the evaluation to a third party provider of the virtual universe product; and initiate a support session with the avatar by the third party provider, in response to the transmitting of the evaluation, for the virtual universe product that is based on the evaluation, wherein the initiating of the support session includes opening a communication channel with a customer service representative that is associated with the third party provider to obtain answers and assistance with regard to the virtual universe product, wherein the assistance is based on a particular feedback of the evaluation, wherein a user of the avatar generates the received evaluation of the virtual universe product using at least one input device of the computing system, the at least one input device configured to:

allow the user to control the avatar within the virtual universe, and input information into the evaluation of the virtual universe product.

18. The method of claim 1, further comprising:

managing, by a virtual region management component, a virtual universe region in which the created virtual universe medium resides according to region requirements that affect avatars in the virtual universe, wherein managing the virtual universe region comprises changing renderings of landscapes, homes, parks, and restaurants located within the virtual universe region.

19. The method of claim 18, wherein managing the virtual universe region further comprises:

organizing elements displayed in the virtual universe region based on avatar interactions with one or more elements in the virtual universe region.

* * * * *